United States Patent
Li et al.

(10) Patent No.: US 12,423,557 B2
(45) Date of Patent: Sep. 23, 2025

(54) LSTM-BASED HOT-ROLLING ROLL-BENDING FORCE PREDICTING METHOD

(71) Applicant: Northeastern University, Shenyang (CN)

(72) Inventors: Xu Li, Shenyang (CN); Feng Luan, Shenyang (CN); Lin Wang, Shenyang (CN); Yan Wu, Shenyang (CN); Yuejiao Han, Shenyang (CN); Dianhua Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 754 days.

(21) Appl. No.: 17/784,430

(22) PCT Filed: Jul. 29, 2021

(86) PCT No.: PCT/CN2021/109203
§ 371 (c)(1),
(2) Date: Jun. 10, 2022

(87) PCT Pub. No.: WO2022/116571
PCT Pub. Date: Jun. 9, 2022

(65) Prior Publication Data
US 2023/0004781 A1 Jan. 5, 2023

(30) Foreign Application Priority Data
Dec. 4, 2020 (CN) .......................... 202011411870.X

(51) Int. Cl.
*G06N 3/044* (2023.01)
*B21B 37/38* (2006.01)
(Continued)

(52) U.S. Cl.
CPC ............. *G06N 3/044* (2023.01); *B21B 37/38* (2013.01); *G06F 17/16* (2013.01); *G06N 3/063* (2013.01); *G06N 3/08* (2013.01); *B21B 2269/02* (2013.01)

(58) Field of Classification Search
CPC ..... B21B 2269/02; B21B 37/38; G06F 17/16; G06N 3/044; G06N 3/0442; G06N 3/063;
(Continued)

(56) References Cited

FOREIGN PATENT DOCUMENTS

| CN | 108655186 A | 10/2010 |
|---|---|---|
| CN | 108805346 A | 11/2018 |

(Continued)

OTHER PUBLICATIONS

Li et al., "A Comparative Assessment of Six Machine Learning Models for Prediction of Bending Force in Hot Strip Rolling Process", May 22, 2020, Metals 2020, 10, 685; doi:10.3390/met10050685, pp. 1-16. (Year: 2020).*

*Primary Examiner* — Brent Johnston Hoover
(74) *Attorney, Agent, or Firm* — Muncy, Geissler, Olds & Lowe, P.C.

(57) ABSTRACT

Provided is an LSTM-based hot-rolling roll-bending force predicting method including the steps of acquiring final rolling data of a stand of a stainless steel rolling mill when performing a hot rolling process, and dividing the data into a training set traindata and a test set testdata; normalizing the traindata; building a matrix P; using a last row of the matrix P as a label of the training set, namely a true value; calculating and updating an output value and the true value of a network; after network training is completed, taking the last m output data of the LSTM network as an input at a next moment, and then obtaining an output of the network at the next moment, wherein the output is a predicted value of the roll-bending force at the next moment; repeating the steps
(Continued)

until a sufficient number of prediction data is obtained; and comparing the processed data with the true value in the testdata to check the validity of the network.

3 Claims, 19 Drawing Sheets

(51) Int. Cl.
*G06F 17/16* (2006.01)
*G06N 3/063* (2023.01)
*G06N 3/08* (2023.01)

(58) Field of Classification Search
CPC .......... G06N 3/08; G06N 3/084; G06N 3/086; Y02P 90/30
See application file for complete search history.

(56) References Cited

FOREIGN PATENT DOCUMENTS

| | | |
|---|---|---|
| CN | 111241657 | 6/2020 |
| CN | 111482467 A | 8/2020 |
| CN | 112439794 A | 3/2021 |
| JP | 06297012 | 10/1994 |
| JP | 2003326306 A | 11/2003 |

\* cited by examiner

LSTM-BASED HOT-ROLLING ROLL-BENDING FORCE PREDICTING METHOD

BACKGROUND OF THE INVENTION

1. Field of the Invention

The invention relates to a rolling roll-bending force predicting technique, in particular to an LSTM-based hot-rolling roll-bending force predicting method.

2. The Prior Arts

High-precision rolling requires a rolled steel sheet shape control system to have high precision, fast response and anti-disturbance. Hydraulic roll-bending force control is a basic link of a sheet shape control system in sheet rolling production, and the principle is to change the crown of a roll gap by applying roll-bending force to the necks of work rolls and support rolls to cause bending deformation of the rolls, thereby affecting the shape of the roll gap in the rolling process, promoting the shape of strip steels to change in the width direction, compensating the poor sheet shape caused by changes in other rolling process factors, and guaranteeing the sheet shape accuracy of outlets of strip steels. Therefore, the prediction accuracy of the roll-bending force has an important influence on the sheet shape and the sheet shape control accuracy, especially the heads of the strip steels. The higher prediction accuracy of the roll-bending force is beneficial to closed-loop feedback control. In actual production, the roll-bending force is usually calculated comprehensively according to temperature, thickness, width, rolling force, material, thermal expansion of the rolls, wear, flatness, and crown of the rolls, and the like of the strip steels. However, an existing roll-bending force prediction model based on a traditional mathematical method has a very complex structure, and each influencing factor has the characteristics of being non-linear, strong in coupling and time-varying, which seriously affects the improvement accuracy of the roll-bending force prediction model. Therefore, it is very necessary to explore a new roll-bending force prediction model.

The neural network has been widely used in many fields because of unique properties. The neural network is characterized in that system modeling with complex internal relations can be completed, and traditional nonlinear problems can be solved. In addition, the network also has good robustness and fault tolerance. In recent years, many scholars gradually apply the neural network algorithm to the field of roll-bending force prediction, and achieve good prediction results, such as preset control of the roll-bending force of a hot continuous rolling mill by genetic algorithm, preset optimization of the roll-bending force by a BP neural network, and a roll-bending force prediction model of the hot rolled strip steels by the neural network optimized by the genetic algorithm. However, for most of the existing neural network roll-bending force prediction models, many parameters that affect the roll-bending force need to be collected as an input. The parameters are scattered in each component of the entire rolling process, thereby resulting in difficulty in data acquisition work and arduousness in tasks. At the same time, more input parameters not only increase the task of data processing, but also easily lead to the complexity of the model, which further affects the training speed and prediction accuracy of the network. By analyzing the rolling process, it can be found that in the actual rolling process, the rolling roll-bending force is continuous, and each rolling roll-bending force is related to the previous time moment, so that the method has the characteristics of time sequence, while the ordinary neural network does not consider time context information, it is difficult for the ordinary neural network to learn the trend of the time sequence, which will lead to low accuracy of the prediction model, and it is difficult to accurately predict the roll-bending force at the subsequent time.

SUMMARY OF THE INVENTION

In view of defects existing in the prior art, the problem to be solved by the invention is to provide an LSTM-based hot-rolling roll-bending force predicting method, and the method can accurately and efficiently predict the roll-bending force of hot rolled strip steels.

In order to solve the technical problem, the LSTM-based hot-rolling roll-bending force predicting method comprises the following steps:

1) Acquiring final rolling data of a stand of a stainless steel rolling mill when performing a hot rolling process, and collecting roll-bending force data for experiment;
2) Dividing the roll-bending force data into two parts: a training set traindata and a test set testdata according to a specified ratio in time sequence;
3) Normalizing the traindata to obtain a normalized vector A;
4) Building a matrix P by using the vector A in step 3);
5) Taking first m rows of the matrix P in step 4) as an input and sending the first m rows to an LSTM network;
6) Using a last row of the matrix P as a label, namely a true value, of the training set, performing calculation on an output value and the true value of the LSTM network by using a formula to obtain an error, and updating a weight and a bias of the LSTM network by a gradient descent method;
7) After the LSTM network training is completed, taking last m output data of the LSTM network as an input at a next moment, and then obtaining the output of the LSTM network at the next moment, wherein the output is a predicted value of a roll-bending force at the next moment;
8) Repeating step 7) until a sufficient number of prediction data is obtained; and
9) Performing an inverse normalization on the obtained predicted value of the roll-bending force, and comparing the processed data with the true value in the testdata to check the validity of the LSTM network.

In step 4), a matrix $$P = \begin{bmatrix} a_1 & a_2 & \cdots & a_{n-m} \\ a_2 & a_3 & \cdots & a_{n-m+1} \\ \vdots & \vdots & \ddots & \vdots \\ a_{m+1} & a_{m+2} & \cdots & a_n \end{bmatrix},$$

wherein a parameter m is the number of input layer units of a neural network, and n is the number of samples contained in a neural network training set.

In step 5), the LSTM network can adopt a traditional LSTM network, and can also adopt an ON-LSTM network or a double-layer ON-LSTM network, and the double-layer ON-LSTM network is adopted as:

Taking the first m rows of the matrix P in step 4) as an input of a first-layer LSTM, and sending obtained output data as an input to a second-layer LSTM, wherein output data of the second-layer LSTM is an output of the whole LSTM network.

The first layer LSTM and the second layer LSTM of the double-layer ON-LSTM network introduce an ordered neurons LSTM of an update mechanism, namely ON-LSTM, and when parameters of the LSTM are updated, neurons are sorted, and an importance level, namely a hierarchical structure, is introduced; higher-level information represents important information, which needs to be retained in the LSTM network; on the contrary, lower-level information represents unimportant information, which needs to be updated with new input data; and a detailed process and calculation formula are as follows:

Assuming that a primary hierarchical position corresponding to the important information is represented by S1, a secondary hierarchical position corresponding to the unimportant information is represented by S2, and S1 and S2 are respectively calculated as:

$$S1=F_1(x_t,h_{t-1})=\text{index max}(\text{soft max}(W_f x_t+U_f h_{t-1}+b_f))$$

$$S2=F_2(x_t,h_{t-1})=\text{index max}(\text{soft max}(W_i x_t+U_i h_{t-1}+b_i))$$

wherein an indexmax function is used to find a position number corresponding to the largest element in the vector; $x_t$ is input data, $h_{t-1}$ is recursive data, $W_f$ and $U_f$ are main forget gate weight matrixes, $b_f$ is a main forget gate bias, $W_i$ and $U_i$ are main input gate weight matrixes, and $b_i$ is a main input gate bias.

When S2≥S1, positions corresponding to the important information and the unimportant information partially overlap, and the calculation formula of a current cell state $c_t$ is:

$$c_t = \begin{pmatrix} c_{t-1}[S2, k] \\ (f_t \circ c_{t-1} + i_t \circ \tilde{c}_t)(S1, S2) \\ \tilde{c}_t[1, S1] \end{pmatrix}.$$

When S2<S1, positions corresponding to the important information and the unimportant information are independent of each other, and the current cell state $c_t$ is calculated by the following formula:

$$c_t = \begin{pmatrix} c_{t-1}[S1, k] \\ 0(S2, S1) \\ \tilde{c}_t[1, S2] \end{pmatrix},$$

wherein k is the dimension of $c_t$, $f_t$ and $i_t$ are forget gate output and input gate output respectively, $\tilde{c}_t$ is an intermediate unit state, and $c_{t-1}$ is a cell state at a previous time moment.

$\tilde{f}_t$ and $\tilde{i}_t$ are defined as a main forget gate and a main input gate respectively, wherein $w_{t1}$, $w_{t2}$ and $w_{t3}$ represent the high, medium and low levels in the hierarchical structure respectively, $$\tilde{f}_t=\text{cumsum}(\text{soft max}(W_f x_t+U_f h_{t-1}+b_f))$$

$$\tilde{i}_t=1-\text{cumsum}(\text{soft max}(W_i x_t+U_i h_{t-1}+b_i))$$

$$W_{t2}=\tilde{f}_t \circ \tilde{i}_t$$

$$W_{t1}=\tilde{f}_t-W_{t2}$$

$$W_{t3}=\tilde{i}_t-W_{t2}$$

wherein $\tilde{f}_t$ is a main forget gate output, and $\tilde{i}_t$ is a main input gate output.

The method has the following beneficial effects and advantages:

1. The LSTM-based hot-rolling roll-bending force predicting method according to the present invention selects an LSTM (Long Short-Term Memory) neural network model, and only a certain number of historical data of roll-bending force that are needed to be input into the network can effectively predict the roll-bending force data at the future time. In addition to the traditional LSTM, an ON-LSTM network with an added update mechanism is also used for prediction. Compared with a method adopting the traditional LSTM network, the accuracy of the network model after adding the update mechanism is improved, and the network is more stable.

2. The invention integrates the update mechanism with a double-layer structure, and thus improves the network performance, so that the prediction accuracy of the network is further improved. Through experiments performed on the traditional LSTM network, the ON-LSTM network and the double-layer ON-LSTM network on the above three data sets, and experiments performed on an artificial neural network (ANN) with the same data set, the comparative experimental results prove the effectiveness of the LSTM (traditional LSTM, ON-LSTM, double-layer ON-LSTM) network model provided by the invention.

DETAILED DESCRIPTION OF THE PREFERRED EMBODIMENT

The invention will be further described below with reference to the accompanying drawings.

Figure 1:
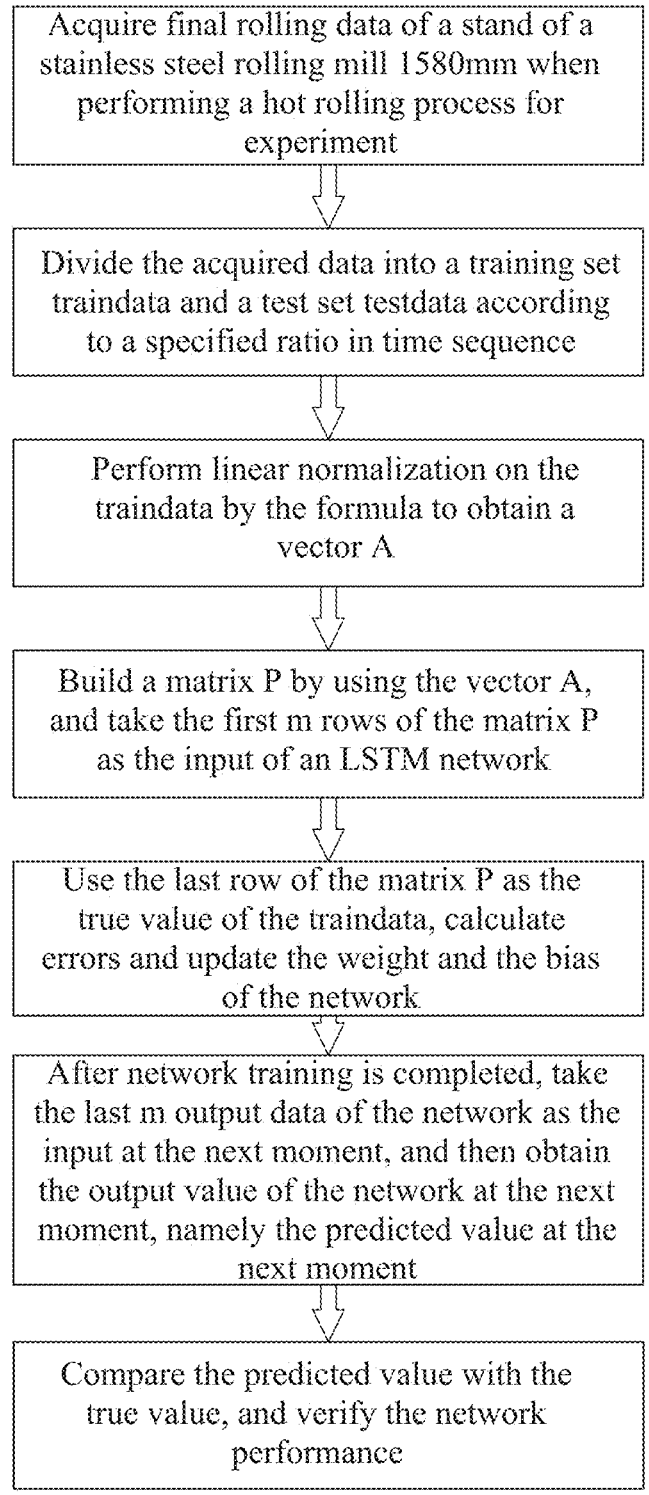
FIG. 1 shows a flowchart of an LSTM-based hot-rolling roll-bending force predicting method according to the present invention.

As shown in FIG. 1, the LSTM-based hot-rolling roll-bending force predicting method according to the present invention comprises the following steps:
1) Acquiring final rolling data of a stand of a stainless steel rolling mill when performing a hot rolling process, and collecting roll-bending force data for experiment;
2) Dividing the roll-bending force data into two parts: a training set traindata and a test set testdata according to a specified ratio in time sequence;
3) Normalizing the input data to obtain a normalized vector A, specifically comprising: performing a linear normalization on the traindata to obtain the normalized vector $A=(a_1, a_2, \ldots, a_n)^T$, wherein a parameter n is the number of samples contained in a neural network training set, and $a_1 \sim a_n$ an are the samples contained in the neural network training set;
4) Building a matrix P by using the vector A in step 3), $$P = \begin{bmatrix} a_1 & a_2 & \cdots & a_{n-m} \\ a_2 & a_3 & \cdots & a_{n-m+1} \\ \vdots & \vdots & \ddots & \vdots \\ a_{m+1} & a_{m+2} & \cdots & a_n \end{bmatrix},$$

wherein a parameter m is the number of input layer units of a neural network, and n is the number of samples;
5) Taking first m rows of the matrix P in step 4) as an input and sending the first m rows to the LSTM network;
6) Using a last row of the matrix P as a label, namely a true value, of the training set, performing calculation on an output value and the true value of the LSTM network by using a formula to obtain an error, and updating a weight and a bias of the LSTM network by a gradient descent method;
7) After the LSTM network training is completed, taking last m output data of the LSTM network as an input at a next moment, and then obtaining the output of the LSTM network at the next moment, wherein the output is a predicted value of a roll-bending force at the next moment;
8) Repeating step 7) until a sufficient number of prediction data is obtained; and
9) Performing an inverse normalization on the obtained predicted value of the roll-bending force, and comparing the processed data with the true value in the testdata to check the validity of the LSTM network.

Figure 2:
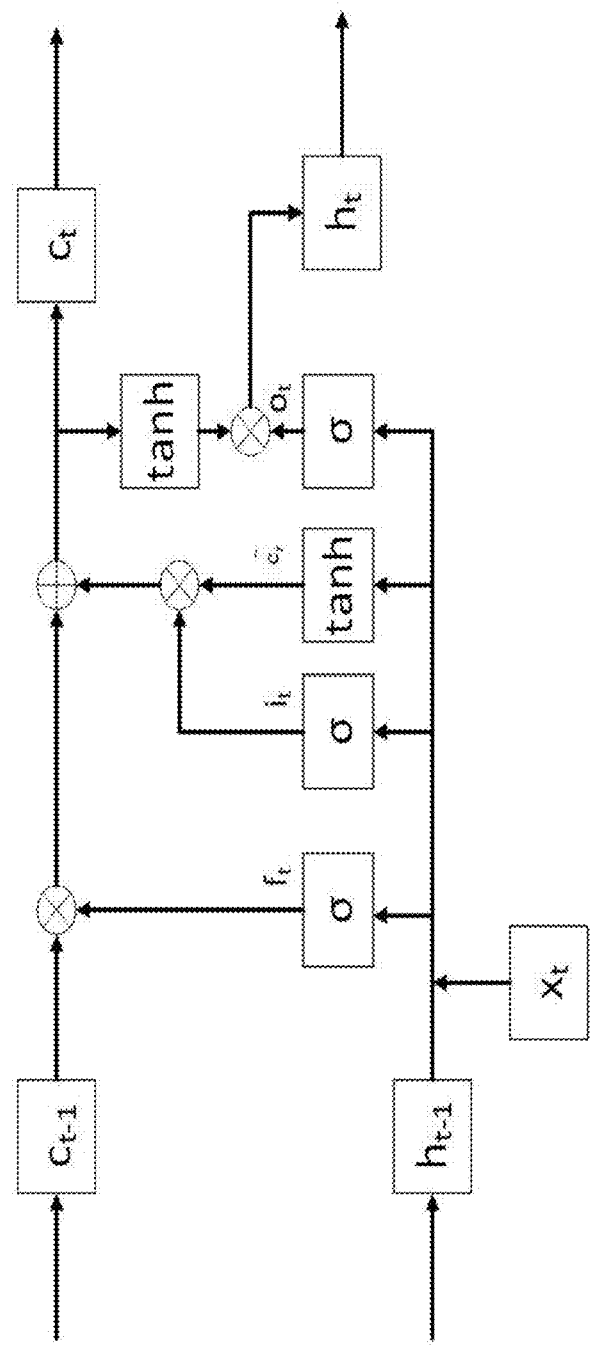
FIG. 2 shows a diagram of a hidden-layer structure of a traditional LSTM.
Figure 3:
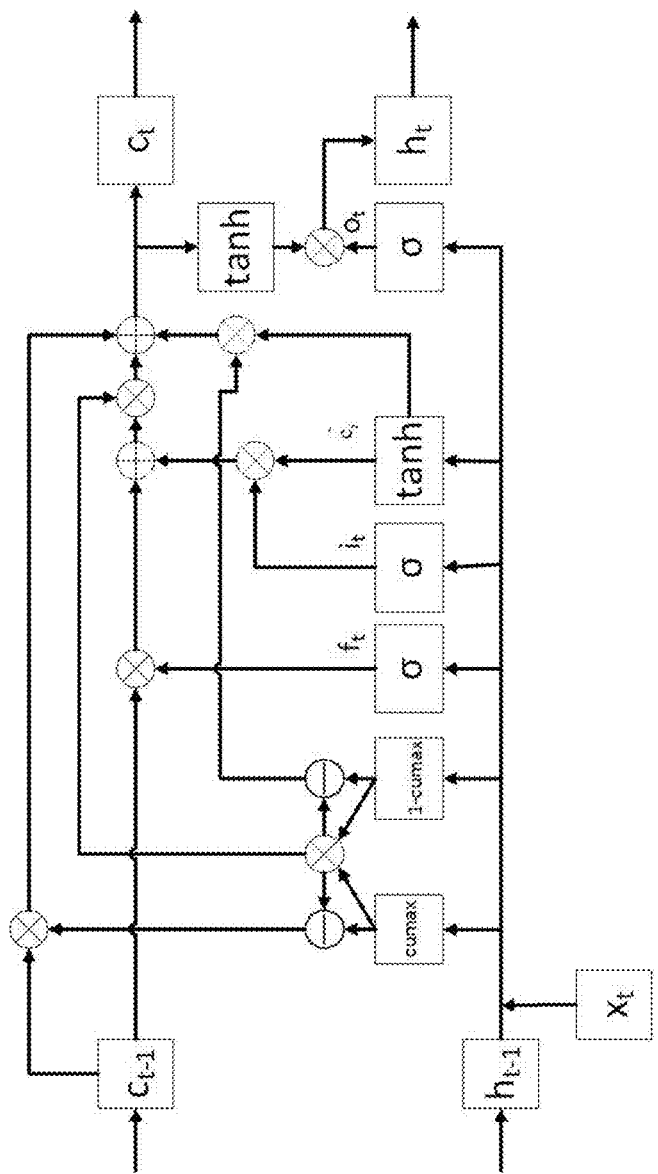
FIG. 3 shows a diagram of a hidden-layer structure of an ON-LSTM.
Figure 4:
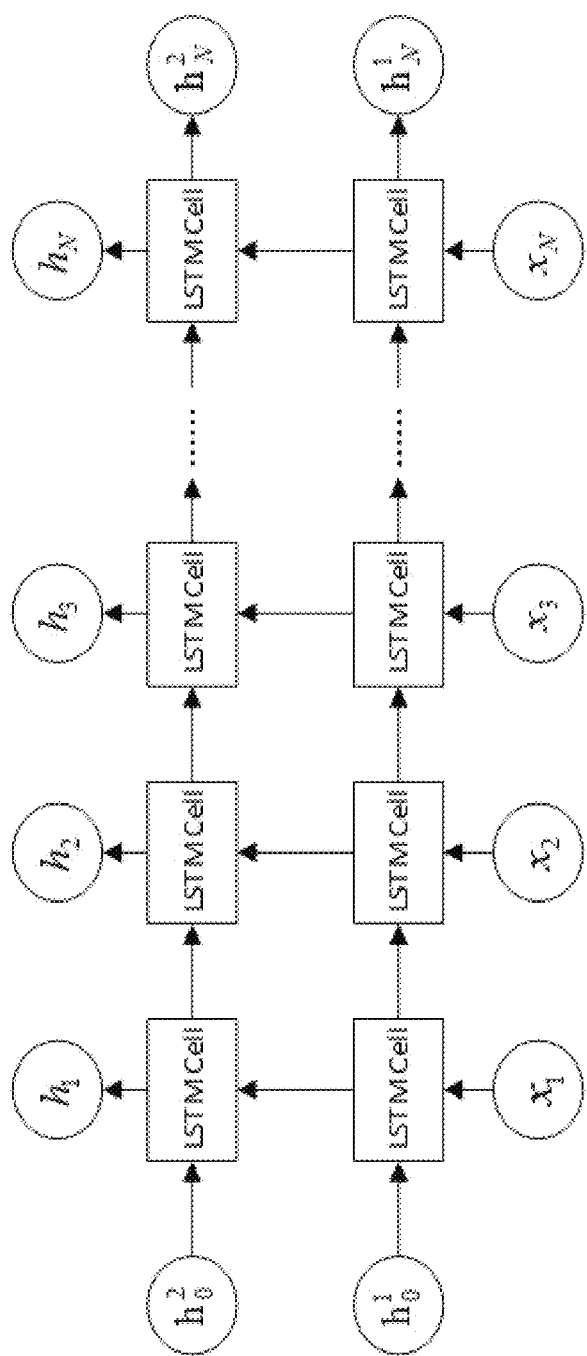
FIG. 4 shows a structure diagram of a double-layer ON-LSTM.

In step 5), the LSTM network can adopt a traditional LSTM network (a hidden-layer structure is shown as FIG. 2), and can also adopt an ON-LSTM network (the hidden-layer structure is shown as FIG. 3), or a double-layer ON-LSTM network (the hidden-layer structure is shown as FIG. 4).

When the ON-LSTM network is adopted, steps 1)-9) of the method adopting the ON-LSTM network are the same as those of the method adopting the traditional LSTM network.

When the double-layer ON-LSTM network is adopted, steps 1)-4) and steps 6)-9) of the method adopting the double-layer ON-LSTM network are the same as those of the method adopting the traditional LSTM network, but step 5) is implemented in the following way: the first m rows of the matrix P in step 4) are used as an input of a first-layer LSTM, and the obtained output data as an input is sent to the second-layer LSTM. The output data of the second-layer LSTM is an output of the whole LSTM network.

In step 5), the first-layer LSTM and the second-layer LSTM are ordered neuron LSTMs that introduce an update mechanism, namely ON-LSTM. The function of the update mechanism lies in that when the parameters of the LSTM are updated, each neuron is sorted in a certain order, and the importance level, that is, a hierarchical structure, is introduced. Higher-level information represents important information, which needs to be retained in the LSTM network. Conversely, lower-level information represents unimportant information. For example, if the roll-bending force data at a certain moment is very different from that at the previous time moment and the subsequent time moment, thereby resulting in a big jump, it does not contribute much to the trend learning of the entire roll-bending force data, so that it is the unimportant information, and the other data are relatively the important information.

The unimportant information needs to be updated with new input data. The detailed process and calculation formula are as follows:

Assuming that a primary hierarchical position corresponding to the important information is represented by S1, a secondary hierarchical position corresponding to the unimportant information is represented by S2. Through $x_t$ and $h_{t-1}$, S1 and S2 are calculated as:

$$S1 = F_1(x_t, h_{t-1}) = \text{index max}(\text{soft max}(W_f x_t + U_f h_{t-1} + b_f))$$

$$S2 = F_2(x_t, h_{t-1}) = \text{index max}(\text{soft max}(W_f x_t + U_f h_{t-1} + b_f))$$

wherein an indexmax function is used to find a position number (sorting from 1) corresponding to the largest element in the vector, $x_t$ is input data, $h_{t-1}$ is recursive data, W and U are weight matrixes, and b is a bias.

The network updates $c_t$ based on the hierarchical positions. Considering the relative magnitude between S1 and S2, there are two classes of update models: (1) when $S2 \geq S1$, the positions corresponding to the important information and the unimportant information partially overlap, and the calculation formula of a current cell state $c_t$ is:

$$c_t = \begin{pmatrix} c_{t-1}[S2, k] \\ (f_t \circ c_{t-1} + i_t \circ \tilde{c}_t)(S1, S2) \\ \tilde{c}_t[1, S1] \end{pmatrix}.$$

(2) When $S2 < S1$, the positions corresponding to the important information and the unimportant information are independent of each other, and the current cell state $c_t$ is calculated by the following formula:

$$c_t = \begin{pmatrix} c_{t-1}[S1, k] \\ 0(S2, S1) \\ \tilde{c}_t[1, S2] \end{pmatrix}$$

wherein k is the dimension of $c_t$, $f_t$ and $i_t$ are forget gate output and input gate output, respectively, and $\tilde{c}_t$ is an intermediate unit state.

For the convenience of describing the update process, $\tilde{f}_t$ and $\tilde{i}_t$ are defined as a main forget gate and a main input gate, respectively, wherein $w_{t1}$, $w_{t2}$ and $w_{t3}$ represent high, medium and low levels in the hierarchical structure, respectively.

$$\tilde{f}_t = \text{cumsum}(\text{soft max}(W_{\tilde{f}}x_t + U_{\tilde{f}}h_{t-1} + b_{\tilde{f}}))$$

$$\tilde{i}_t = 1 - \text{cumsum}(\text{soft max}(W_{\tilde{i}}x_t + U_{\tilde{i}}h_{t-1} + b_{\tilde{i}}))$$

$$W_{t2} = \tilde{f}_t \circ \tilde{i}_t$$

$$W_{t1} = \tilde{f}_t - W_{t2}$$

$$W_{t3} = \tilde{i}_t - W_{t2}$$

The complete update formula of the ON-LSTM network is:

$$\begin{cases} f_t = \sigma(W_{fx}x_t + W_{fh}h_{t-1} + b_f) \\ i_t = \sigma(W_{ix}x_t + W_{ih}h_{t-1} + b_i) \\ o_t = \sigma(W_{ox}x_t + W_{oh}h_{t-1} + b_o) \\ \tilde{c}_t = \tanh(W_{cx}x_t + W_{ch}h_{t-1} + b_c) \\ \tilde{f}_t = cu\max(W_{\tilde{f}x}x_t + W_{\tilde{f}h}h_{t-1} + b_{\tilde{f}}) \\ \tilde{i}_t = 1 - cu\max(W_{\tilde{i}x}x_t + W_{\tilde{i}h}h_{t-1} + b_{\tilde{i}}) \\ W_{t2} = \tilde{f}_t \circ \tilde{i}_t \\ W_{t1} = \tilde{f}_t - W_{t2} \\ W_{t3} = \tilde{i}_t - W_{t2} \\ c_t = W_{t1} \circ c_{t-1} + W_{t2} \circ (f_t \circ c_{t-1} + i_t \circ \tilde{c}_t) + W_{t3} \circ \tilde{c}_t \\ h_t = o_t \circ \tanh(c_t) \end{cases}$$

wherein the cumax function is an abbreviation for cumsum (softmax( )).

The update calculation process of the LSTM network weights and biases mentioned in step 6) is as follows:

The calculation formula of the weighted input error term of the traditional LSTM and the ON-LSTM networks is:

$$\begin{cases} \delta_{i,t}^T = \delta_t^T \circ o_t \circ (1 - \tanh(c_t)^2) \circ W_{t2} \circ \tilde{c}_t \circ i_t \circ (1 - i_t) \\ \delta_{f,t}^T = \delta_t^T \circ o_t \circ (1 - \tanh(c_t)^2) \circ W_{t2} \circ c_{t-1} \circ f_t \circ (1 - f_t) \\ \delta_{o,t}^T = \delta_t^T \circ \tanh(c_t) \circ o_t \circ (1 - o_t) \\ \delta_{\tilde{c},t}^T = \delta_t^T \circ o_t \circ (1 - \tanh(c_t)^2) \circ (W_{t2} \circ i_t + W_{t3}) \circ (1 - \tilde{c}_t^2) \end{cases}$$

The double-layer ON-LSTM with a double-layer structure is adopted, and two layers of the network are slightly different in the calculation when the weights and the biases are updated. The calculation formulas of the weighted input error terms of the first-layer LSTM and the second-layer LSTM respectively are:

The first-layer LSTM:

$$\begin{cases} \delta_{i,t}^T = (\delta_{f,t}^T W_{fx} + \delta_{i,t}^T W_{ix} + \delta_{\tilde{c},t}^T W_{cx} + \delta_{o,t}^T W_{ox}) \circ \\ \quad o_t \circ (1 - \tanh(c_t)^2) \circ W_{t2} \circ \tilde{c}_t \circ i_t \circ (1 - i_t) \\ \delta_{f,t}^T = (\delta_{f,t}^T W_{fx} + \delta_{i,t}^T W_{ix} + \delta_{\tilde{c},t}^T W_{cx} + \delta_{o,t}^T W_{ox}) \circ \\ \quad o_t \circ (1 - \tanh(c_t)^2) \circ W_{t2} \circ c_{t-1} \circ f_t \circ (1 - f_t) \\ \delta_{o,t}^T = (\delta_{f,t}^T W_{fx} + \delta_{i,t}^T W_{ix} + \delta_{\tilde{c},t}^T W_{cx} + \delta_{o,t}^T W_{ox}) \circ \tanh(c_t) \circ o_t \circ (1 - o_t) \\ \delta_{\tilde{c},t}^T = (\delta_{f,t}^T W_{fx} + \delta_{i,t}^T W_{ix} + \delta_{\tilde{c},t}^T W_{cx} + \delta_{o,t}^T W_{ox}) \circ \\ \quad o_t \circ (1 - \tanh(c_t)^2) \circ (W_{t2} \circ i_t + W_{t3}) \circ (1 - \tilde{c}_t^2) \end{cases}$$

The second-layer LSTM:

$$\begin{cases} \delta_{i,t}^T = \delta_t^T \circ o_t \circ (1 - \tanh(c_t)^2) \circ W_{t2} \circ \tilde{c}_t \circ i_t \circ (1 - i_t) \\ \delta_{f,t}^T = \delta_t^T \circ o_t \circ (1 - \tanh(c_t)^2) \circ W_{t2} \circ c_{t-1} \circ f_t \circ (1 - f_t) \\ \delta_{o,t}^T = \delta_t^T \circ \tanh(c_t) \circ o_t \circ (1 - o_t) \\ \delta_{\tilde{c},t}^T = \delta_t^T \circ o_t \circ (1 - \tanh(c_t)^2) \circ (W_{t2} \circ i_t + W_{t3}) \circ (1 - \tilde{c}_t^2) \end{cases}$$

Wherein $f_t$ is a forget gate output, $i_t$ is an input gate output, $o_t$ is an output gate output, $c_t$ is a current cell state, $c_{t-1}$ is a cell state at a previous time moment, $\tilde{c}_t$ is an intermediate unit state, $x_t$ is input data, $h_t$ is recursive data, $h_{t-1}$ is recursive data at the previous time moment, $\tilde{f}_t$ is a main forget gate output, $\tilde{i}_t$ is a main input gate output, $w_{t1}$ is a high level, $w_{t2}$ is a medium level, $w_{t3}$ is a low level, $W_{fx}$, $W_{ix}$, $W_{cx}$, $W_{ox}$, $W_{\tilde{f}x}$, $W_{\tilde{i}x}$, $W_{fh}$, $W_{ih}$, $W_{ch}$, $W_{oh}$, $W_{\tilde{f}h}$ and $W_{\tilde{i}h}$ are weight matrices, $b_f$, $b_i$, $b_c$, $b_o$, $b_{\tilde{i}}$ and $b_{\tilde{f}}$ are bias vectors, $\delta_t$ is an error term at a time moment t, $\delta_{f,t}$, $\delta_{i,t}$, $\delta_{\tilde{c},t}$ and $\delta_{o,t}$ are error terms corresponding to four weighted inputs of $f_t$, $i_t$, $c_t$, and $o_t$, respectively.

The calculation of a weight gradient:

$$\begin{cases} \dfrac{\partial E}{\partial W_{oh,t}} = \delta_{o,t} h_{t-1}^T \\ \dfrac{\partial E}{\partial W_{fh,t}} = \delta_{f,t} h_{t-1}^T \\ \dfrac{\partial E}{\partial W_{ih,t}} = \delta_{i,t} h_{t-1}^T \\ \dfrac{\partial E}{\partial W_{ch,t}} = \delta_{\tilde{c},t} h_{t-1}^T \end{cases}$$

$$\begin{cases} \dfrac{\partial E}{\partial W_{ox,t}} = \delta_{o,t} x_t^T \\ \dfrac{\partial E}{\partial W_{fx,t}} = \delta_{f,t} x_t^T \\ \dfrac{\partial E}{\partial W_{ix,t}} = \delta_{i,t} x_t^T \\ \dfrac{\partial E}{\partial W_{cx,t}} = \delta_{\tilde{c},t} x_t^T \end{cases}$$

The calculation of a bias gradient:

$$\begin{cases} \dfrac{\partial E}{\partial b_{o,t}} = \delta_{o,t} \\ \dfrac{\partial E}{\partial b_{f,t}} = \delta_{f,t} \\ \dfrac{\partial E}{\partial b_{i,t}} = \delta_{i,t} \\ \dfrac{\partial E}{\partial b_{c,t}} = \delta_{\tilde{c},t} \end{cases}$$

Wherein E is an error, $h_{t-1}^T$ is a transpose of $h_{t-1}$, $x_t^T$ is a transpose of $x_t$, and $W_{oh,t}$ is the $W_{oh}$ at the time moment t. Similarly, $W_{fh,t}$, $W_{ih,t}$, $W_{ch,t}$, $W_{ox,t}$, $W_{fx,t}$, $W_{ix,t}$, $W_{cx,t}$, $b_{o,t}$, $b_{f,t}$, $b_{i,t}$ and $b_{c,t}$ are $W_{fh}$, $W_{ih}$, $W_{ch}$, $W_{ox}$, $W_{fx}$, $W_{ix}$, $W_{cx}$, $b_o$, $b_f$, $b_i$ and $b_c$ at the time moment t.

According to the continuity and time sequence characteristics of the rolling process, the invention selects the LSTM (Long Short-Term Memory) neural network model. The LSTM is a long-term and short-term memory network, which is a time recurrent neural network (RNN), and is mainly used to solve the problem of gradient disappearance and gradient explosion in the long sequence training process. In short, the LSTM can perform better in longer sequences than ordinary RNN.

The invention selects the LSTM network to predict the roll-bending force. Different from the traditional neural network or other machine learning methods, the invention does not need to acquire a large number of input parameters that affect the roll-bending force in advance, and thus the preliminary data preparation work is simplified, and only the roll-bending force data of each moment acquired till the current moment are formed to be a time series as an input and sent to the network, so as to train the LSTM network and predict the roll-bending force at the subsequent time moments.

The invention adopts three different LSTM network models to predict the roll-bending force. In addition to the traditional LSTM network, two improved LSTM networks are also proposed for experiments. The two improved LSTM networks are:

(1) ON-LSTM network: The ON-LSTM network adds an update mechanism on the basis of the traditional LSTM network, and compared with the traditional LSTM, the ON-LSTM can effectively enhance the robustness of the network and improve the accuracy of the network; and (2) Double-layer ON-LSTM: The double-layer ON-LSTM network organically combines the update mechanism with the double-layer structure. Because the double-layer structure has strong function fitting ability, the double-layer ON-LSTM can further improve the prediction accuracy of the network on the basis of the ON-LSTM.

Figure 5A:
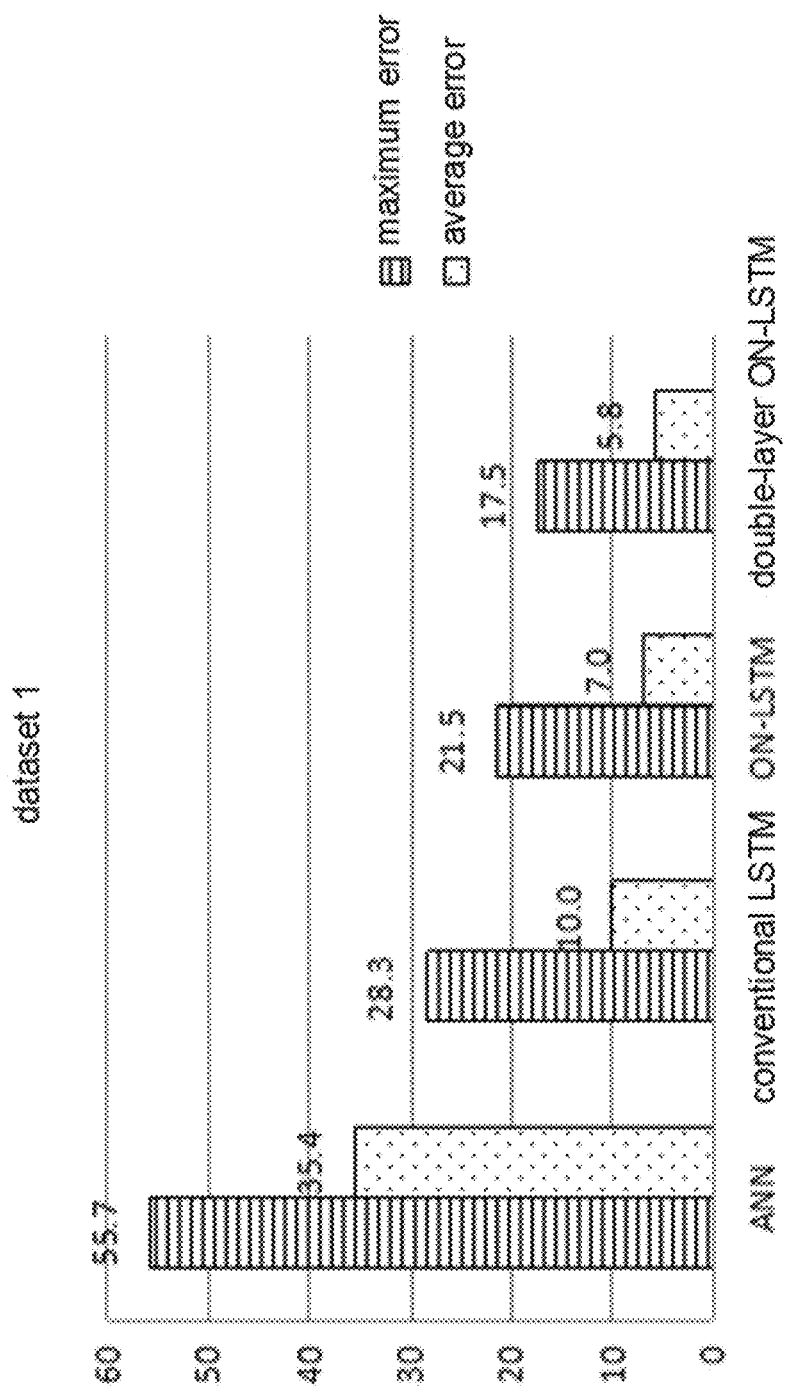
FIG. 5A shows an error comparison diagram of four network models for a data set (1).
Figure 5B:
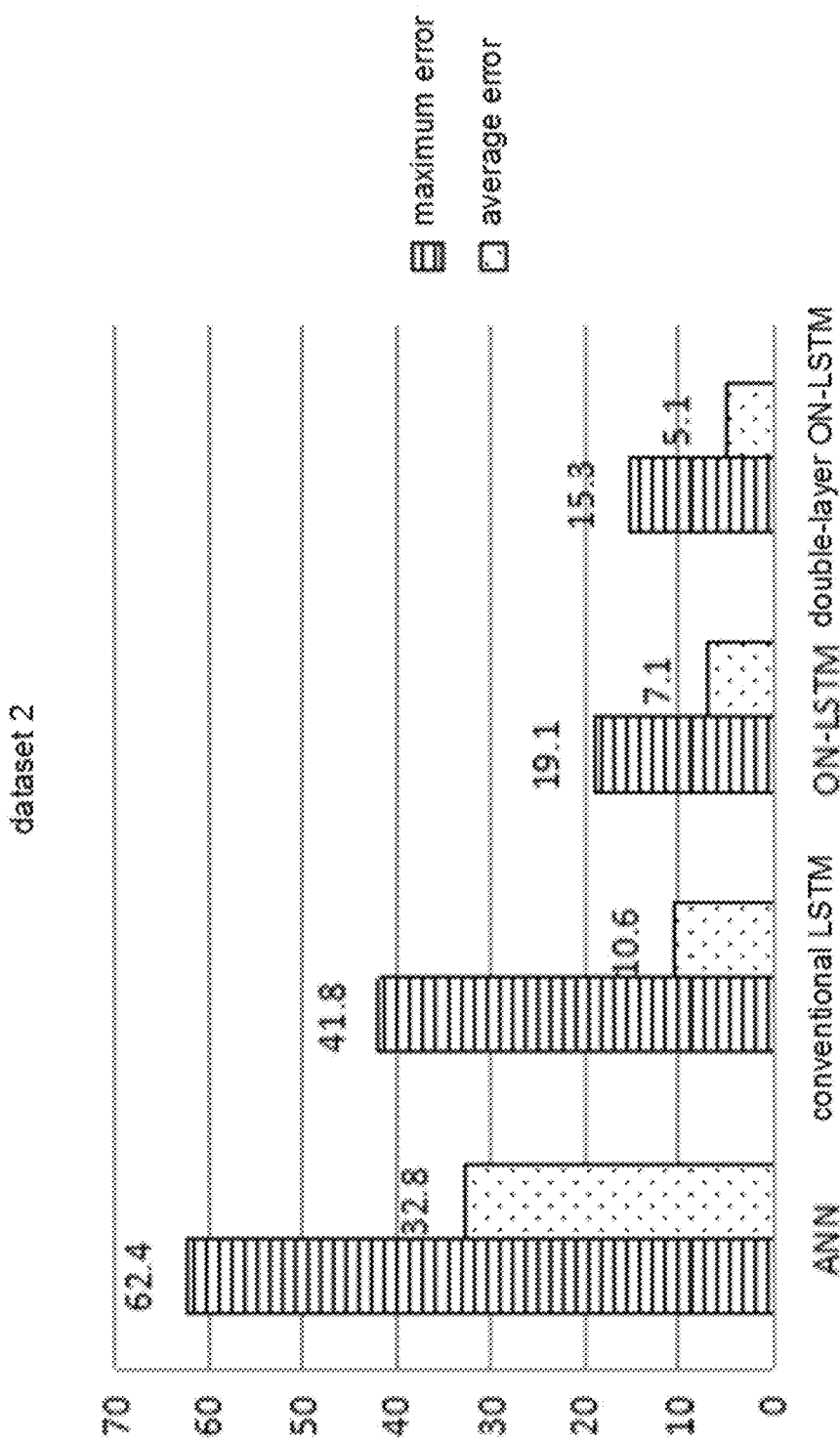
FIG. 5B shows an error comparison diagram of the four network models for a data set (2).
Figure 5C:
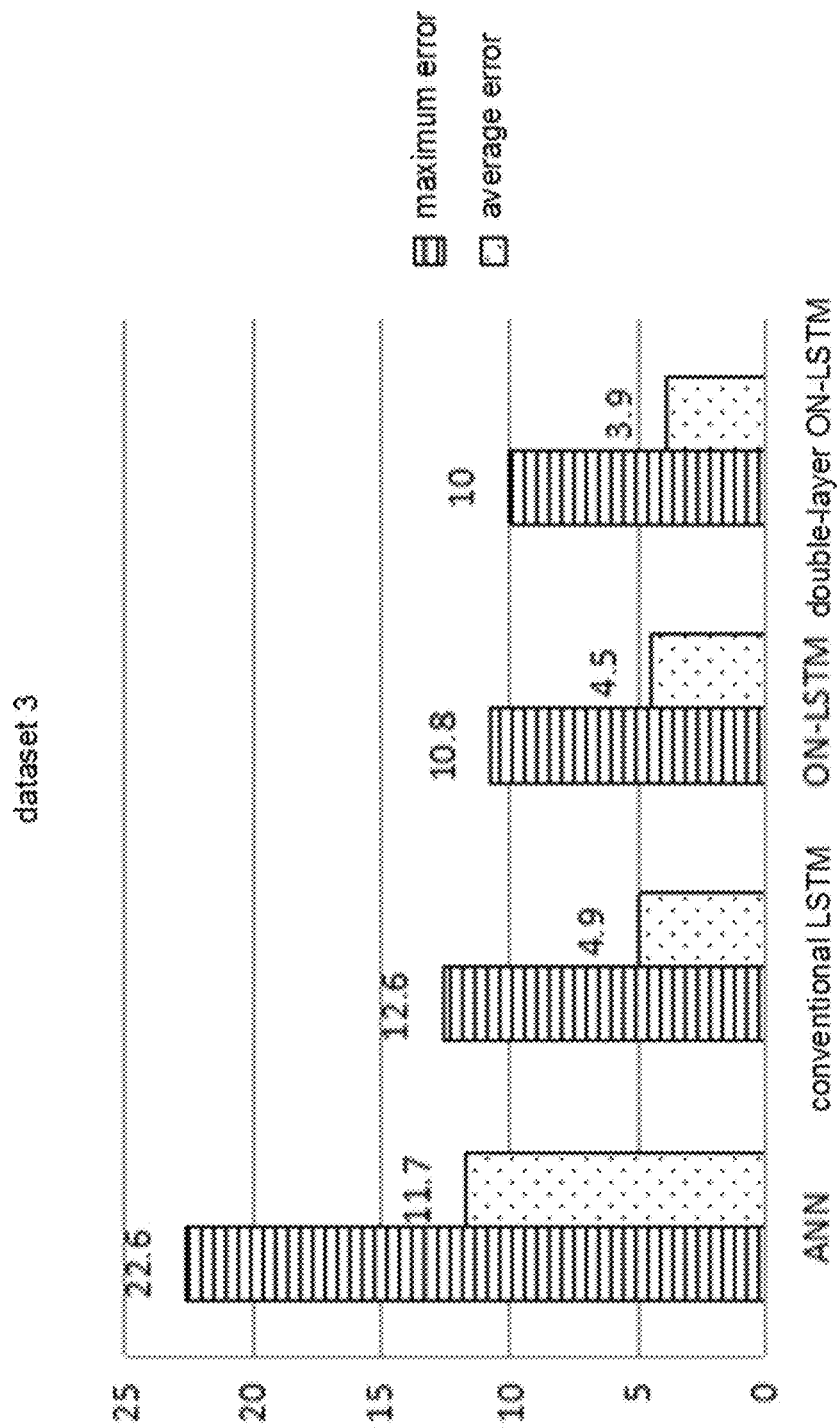
FIG. 5C shows an error comparison diagram of the four network models for a data set (3).
Figure 6A:
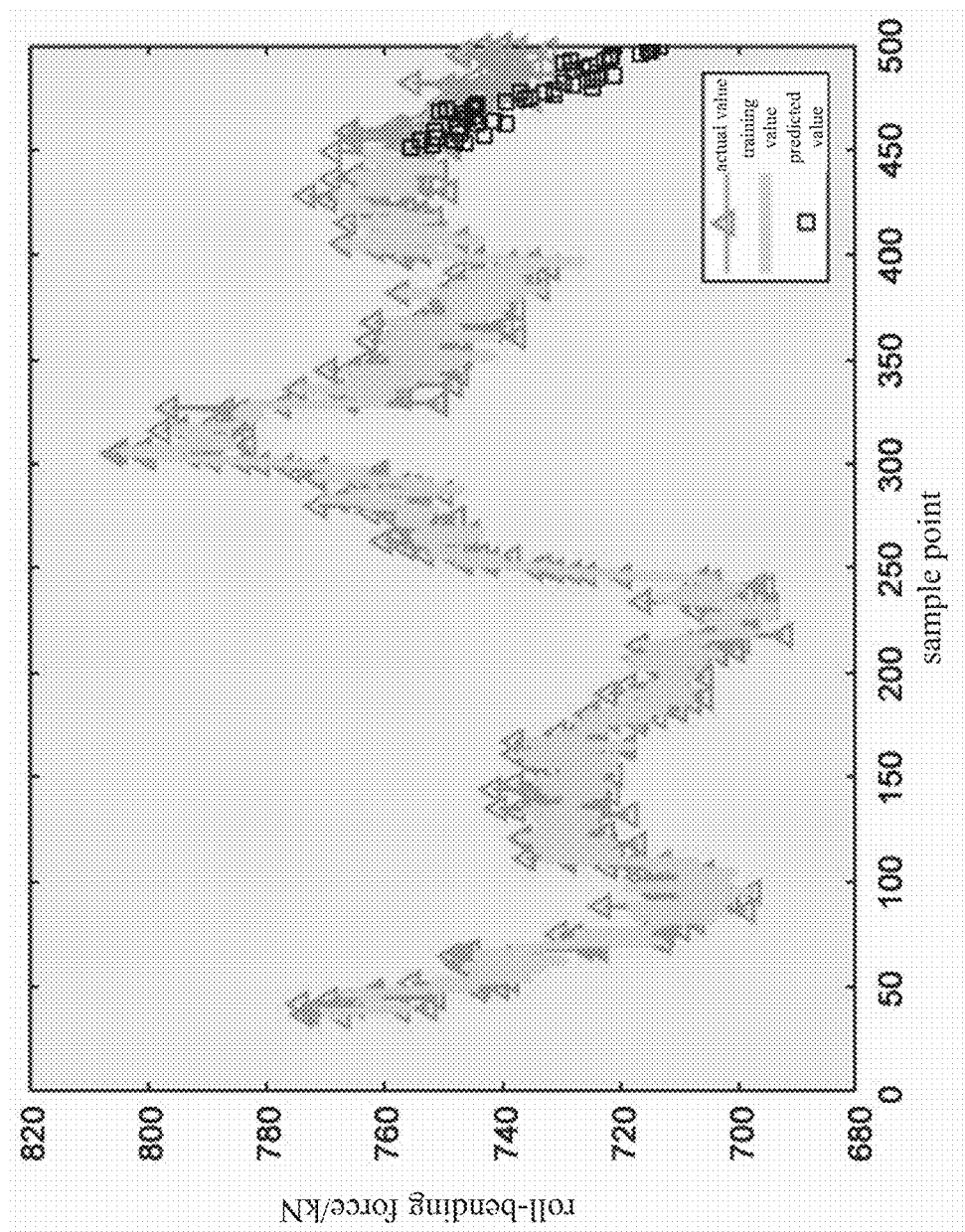
FIG. 6A shows a roll-bending force prediction result of a traditional LSTM network for a data set (1).
Figure 6B:
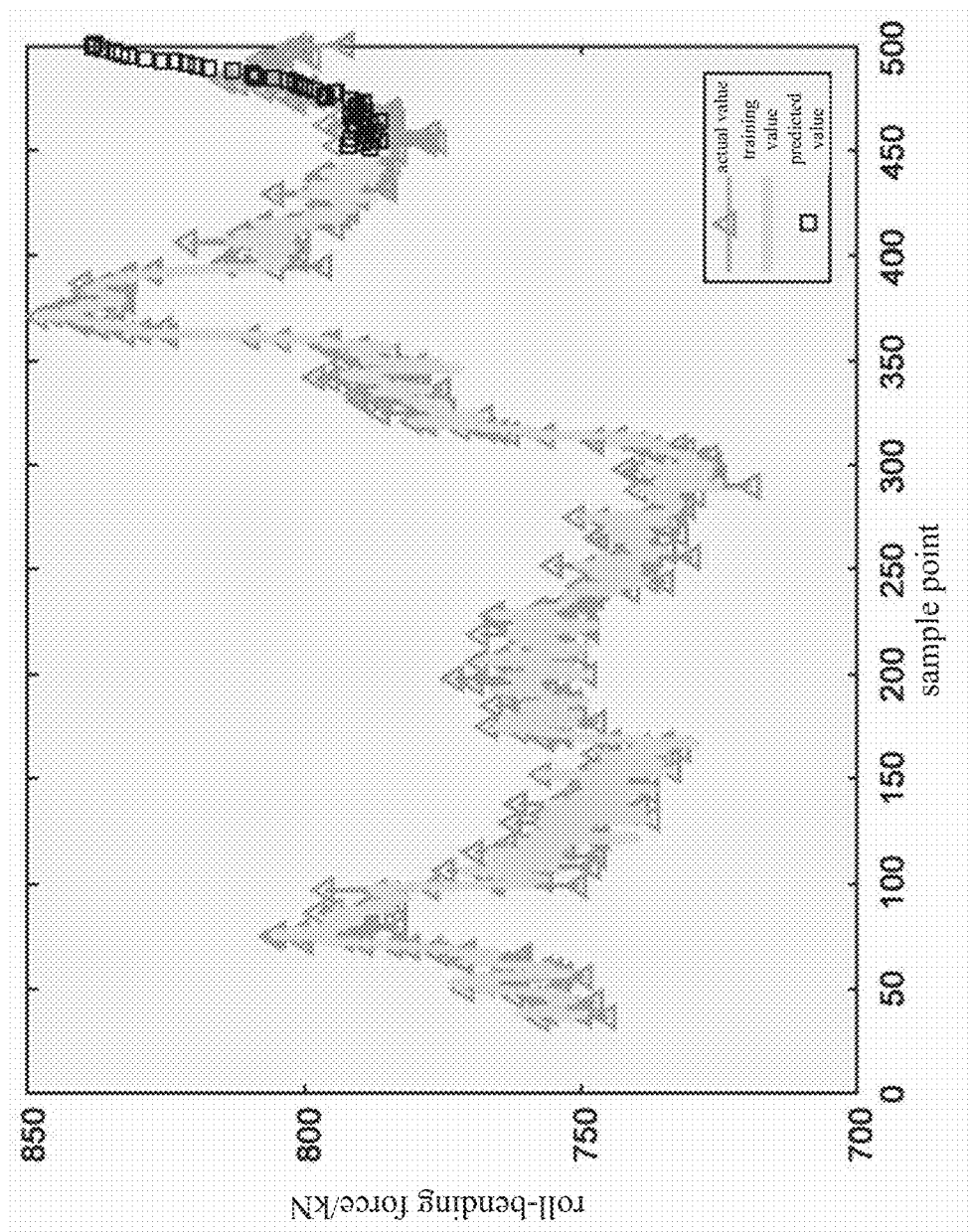
FIG. 6B shows a roll-bending force prediction result of the traditional LSTM network for a data set (2).
Figure 6C:
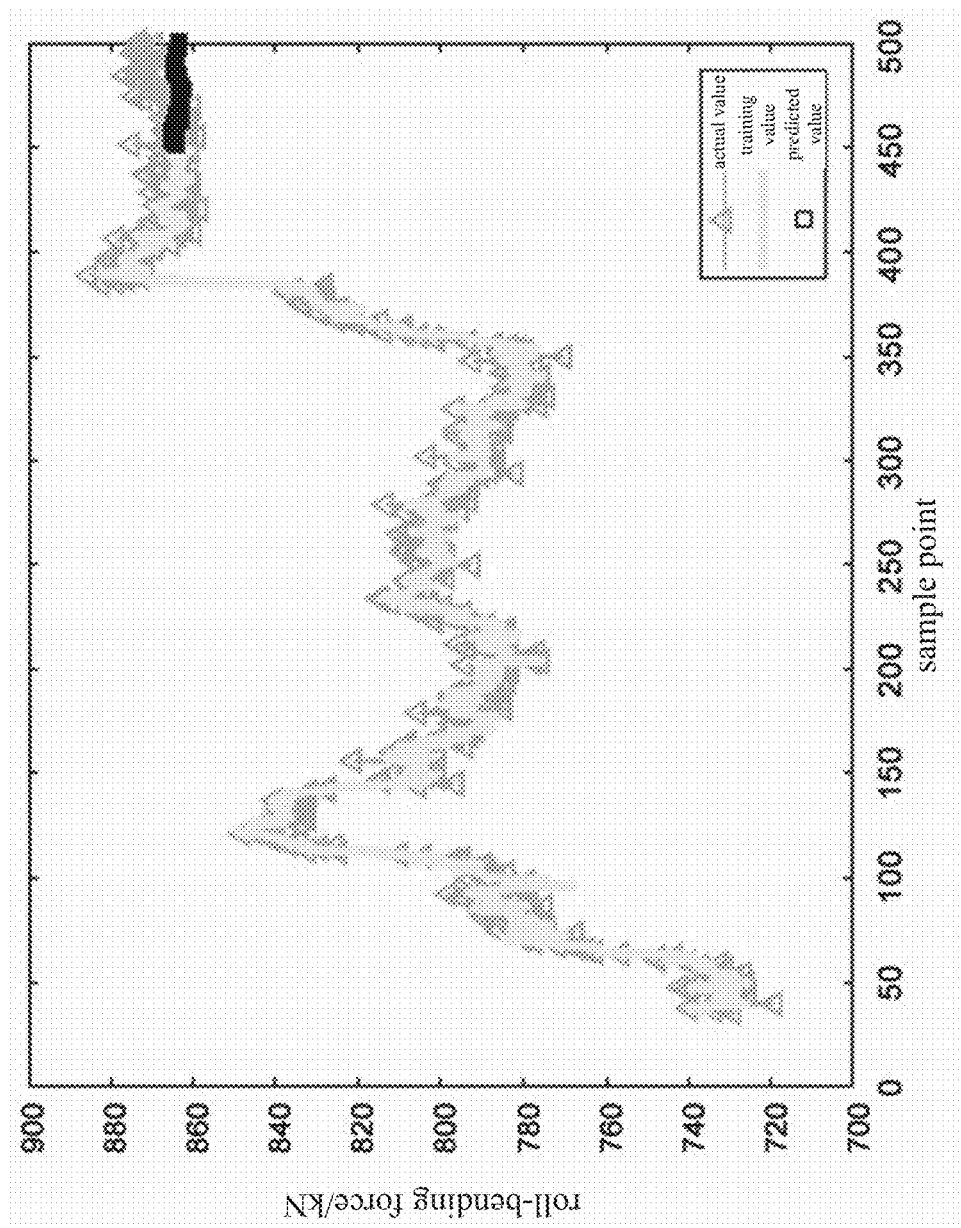
FIG. 6C shows a the roll-bending force prediction result of the traditional LSTM network for a data set (3).
Figure 7A:
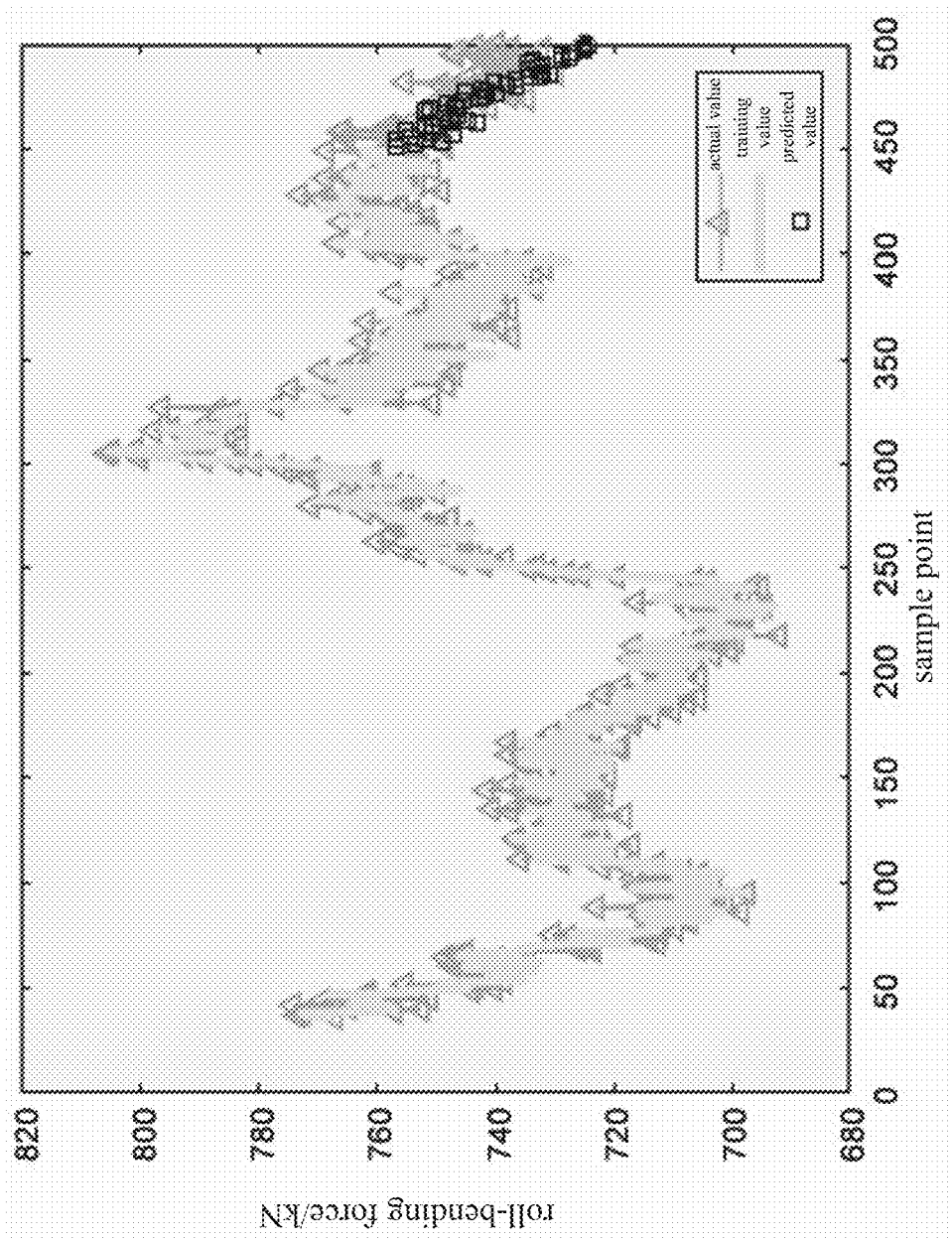
FIG. 7A shows a roll-bending force prediction result of an ON-LSTM network for a data set (1).
Figure 7B:
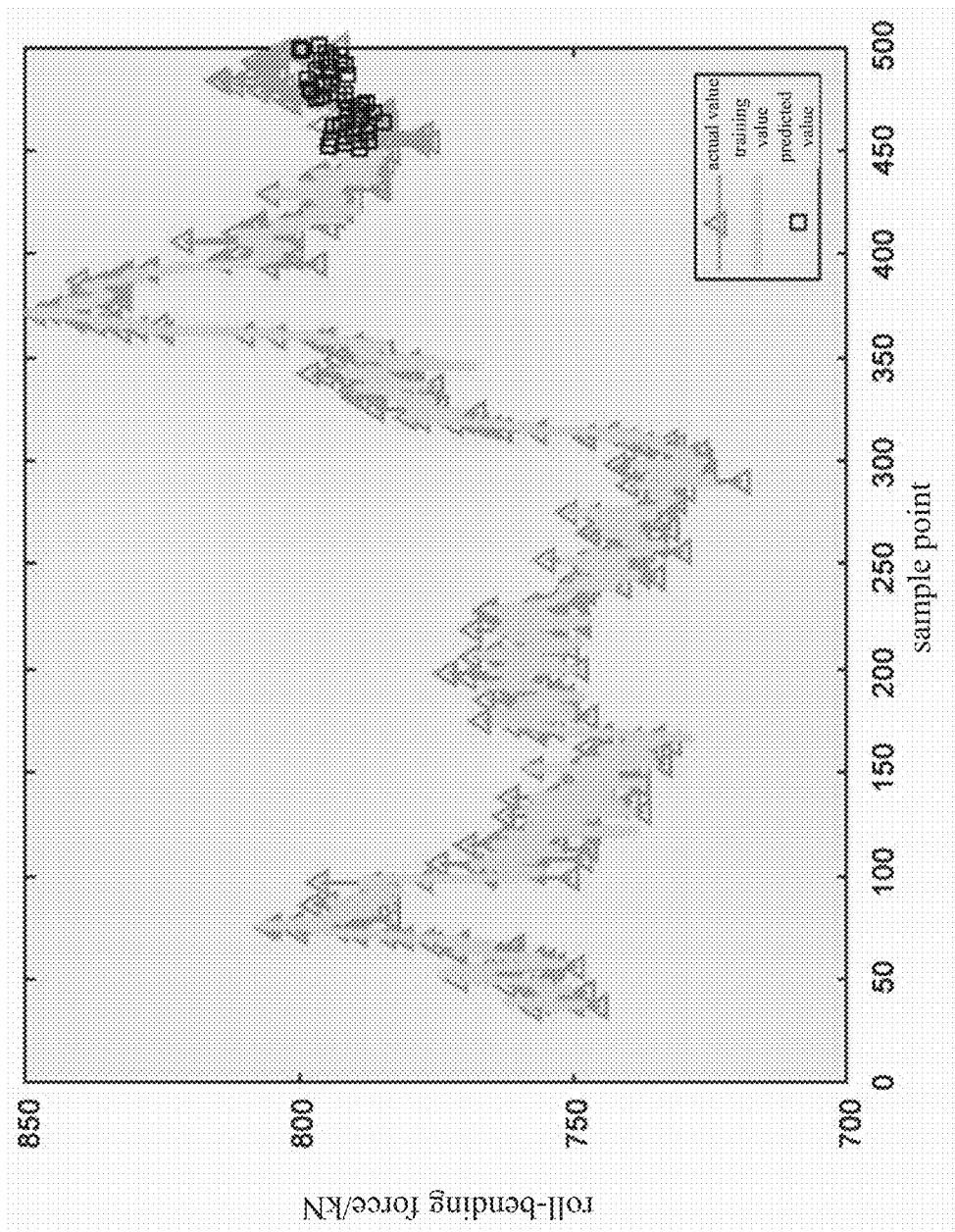
FIG. 7B shows a roll-bending force prediction result of the ON-LSTM network for a data set (2).
Figure 7C:
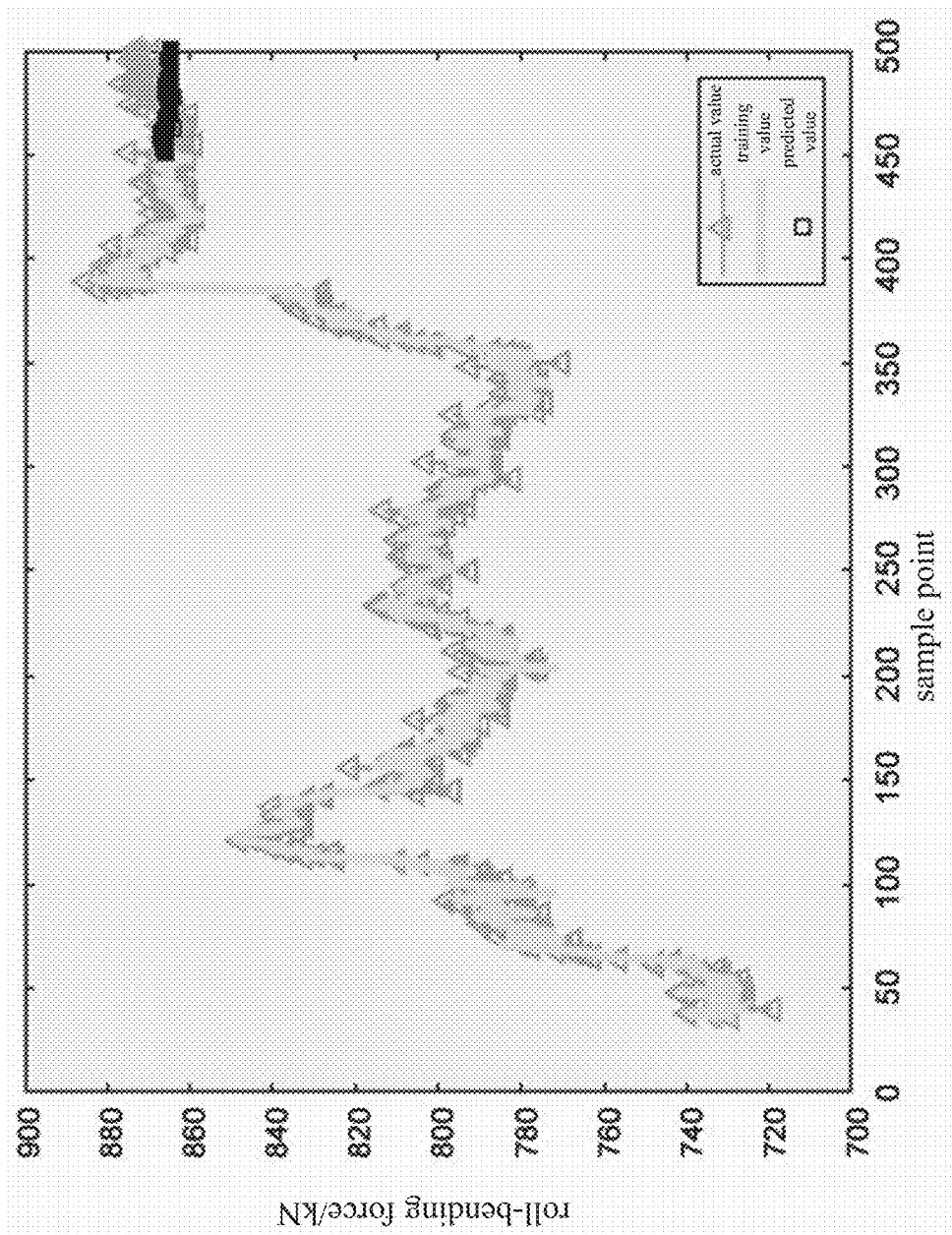
FIG. 7C shows a roll-bending force prediction result of the ON-LSTM network for a data set (3).
Figure 8A:
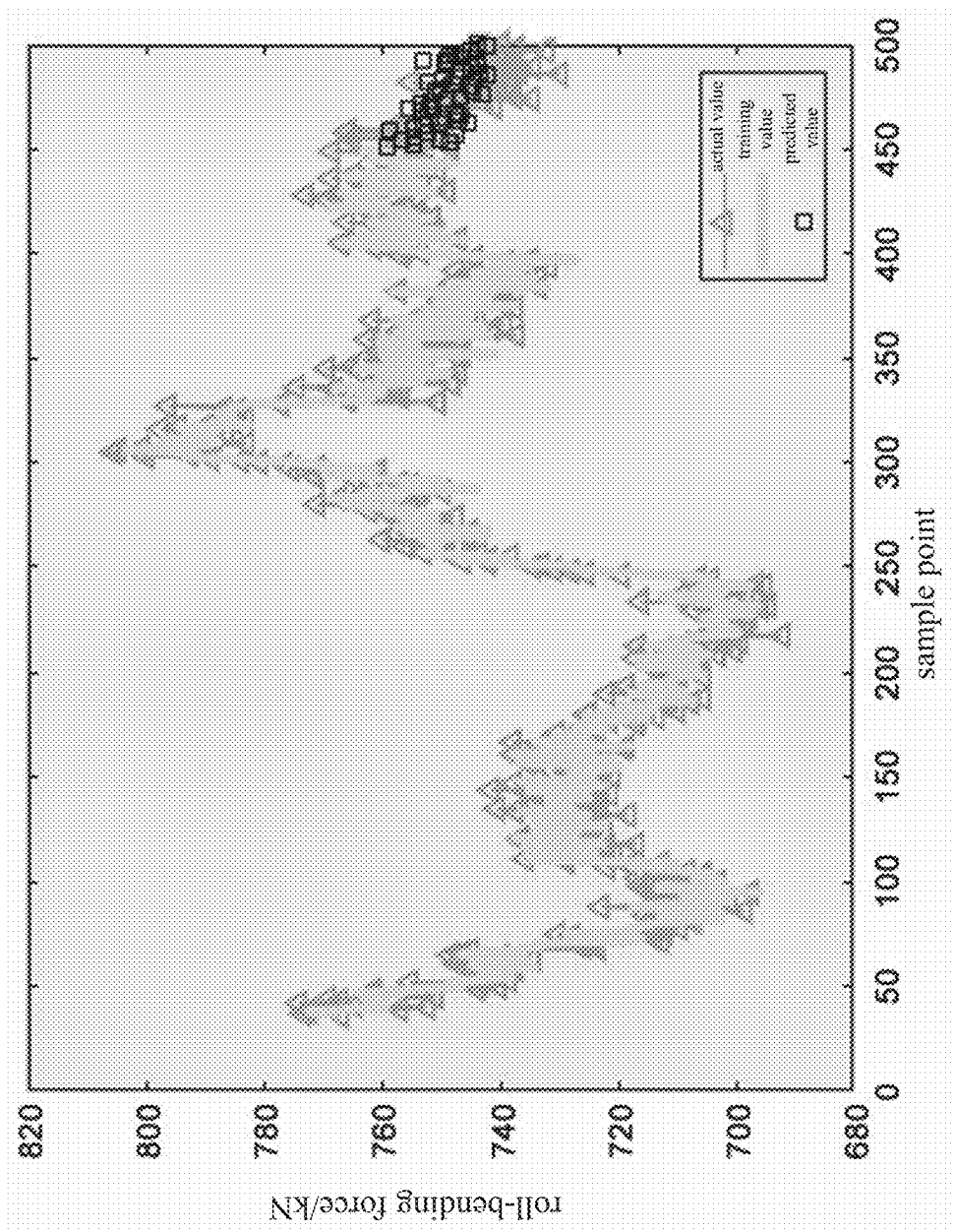
FIG. 8A shows a roll-bending force prediction result of a double-layer ON-LSTM network for a data set (1).
Figure 8B:
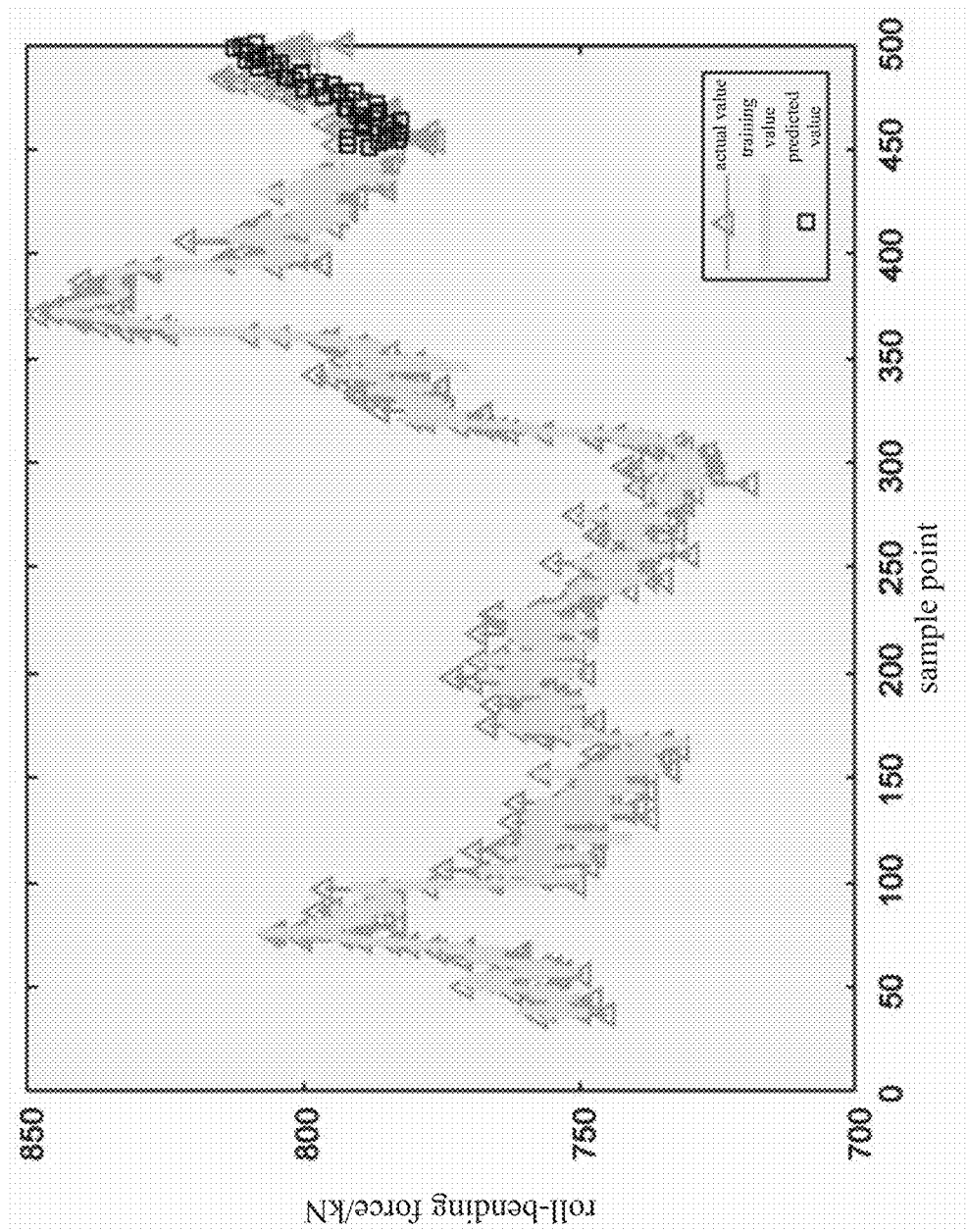
FIG. 8B shows a roll-bending force prediction result of the double-layer ON-LSTM network for a data set (2).
Figure 8C:
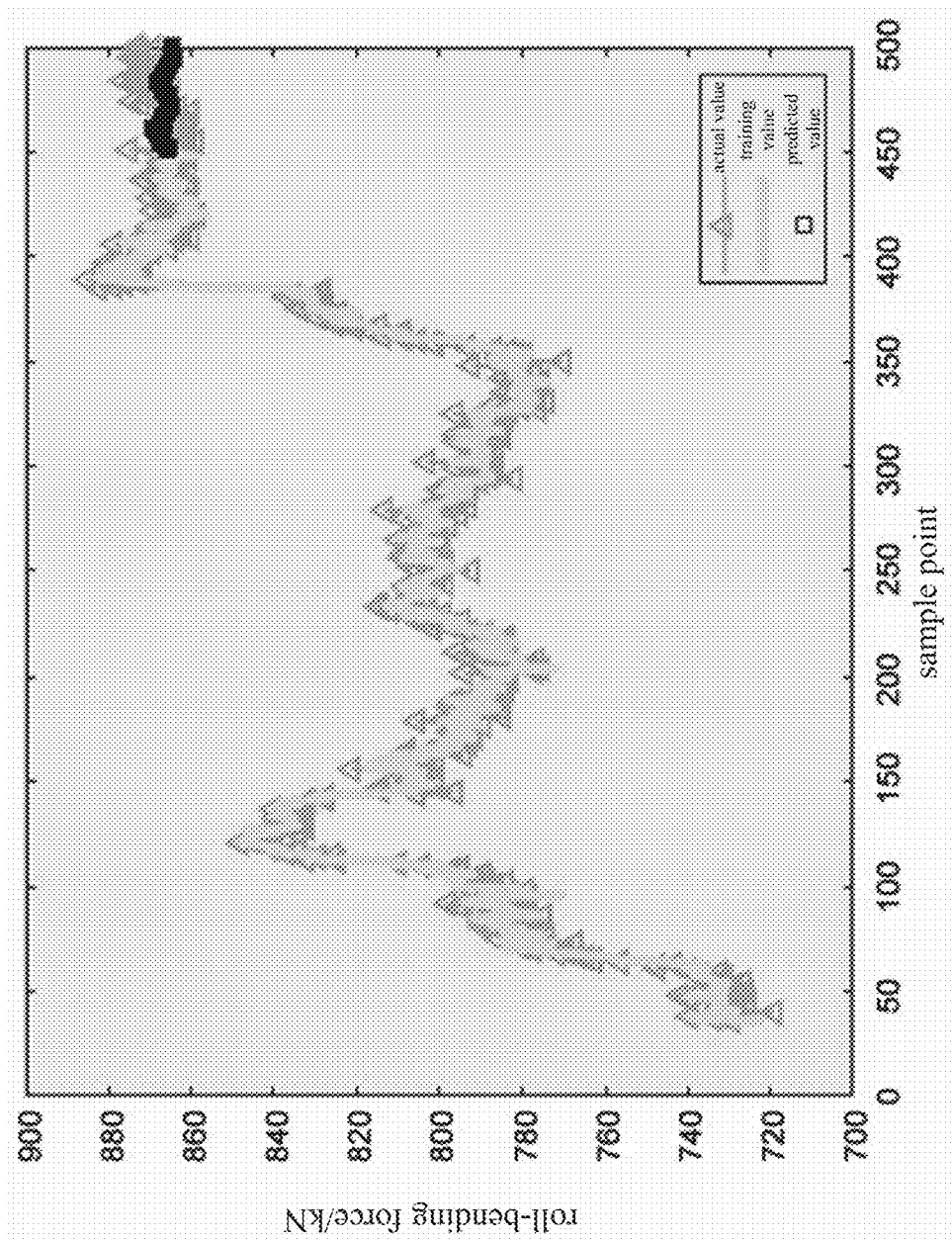
FIG. 8C shows a roll-bending force prediction result of the double-layer ON-LSTM network for a data set (3).

In order to prove the effectiveness of the LSTM (traditional LSTM, ON-LSTM, double-layer ON-LSTM) network model provided by the invention, the roll-bending force data of a 1580 mm hot rolling process of a stainless steel rolling mill are acquired and divided into three different datasets, and each dataset contains 500 sample points. The traditional LSTM network, the ON-LSTM network and the double-layer ON-LSTM network are subjected to experiment on the above three datasets, respectively, and the artificial neural network (ANN) is used to do an experiment with the same dataset to compare the experiment results. The maximum and average errors of three different network models on the three datasets are shown as FIGS. 5A-5C. According to FIGS. 5A-5C, it can be seen that the prediction errors of the three LSTM networks are far smaller than those of the ANN network. Good performance is achieved on the three datasets 1-3 (The acquired roll-bending force data are cut and divided into the datasets 1-3, which selects three representative pieces of different data as three datasets for the experiments) in three LSTM networks, and it can be found that the ON-LSTM network with the update mechanism is better than the traditional LSTM network. In addition, after constructing the ON-LSTM into the double-layer structure, the network performance is further improved, and the double-layer ON-LSTM network has the smallest error and the best performance among the three LSTM networks.

First 450 sample points are taken from three different datasets for network training, and the trained LSTM networks are used to predict next 50 sample points, namely the roll-bending force data at the next 50 sample points. The results are shown as FIGS. 6A-6C, FIGS. 7A-7C and FIGS. 8A-8C, and it can be seen that the three LSTM networks provided by the invention can effectively predict the roll-bending force data in the subsequent time moment, and have good fitting ability. The degree of excellence of the three LSTM networks is from high to low: the double-layer ON-LSTM, the ON-LSTM and the traditional LSTM.

Figure 9A:
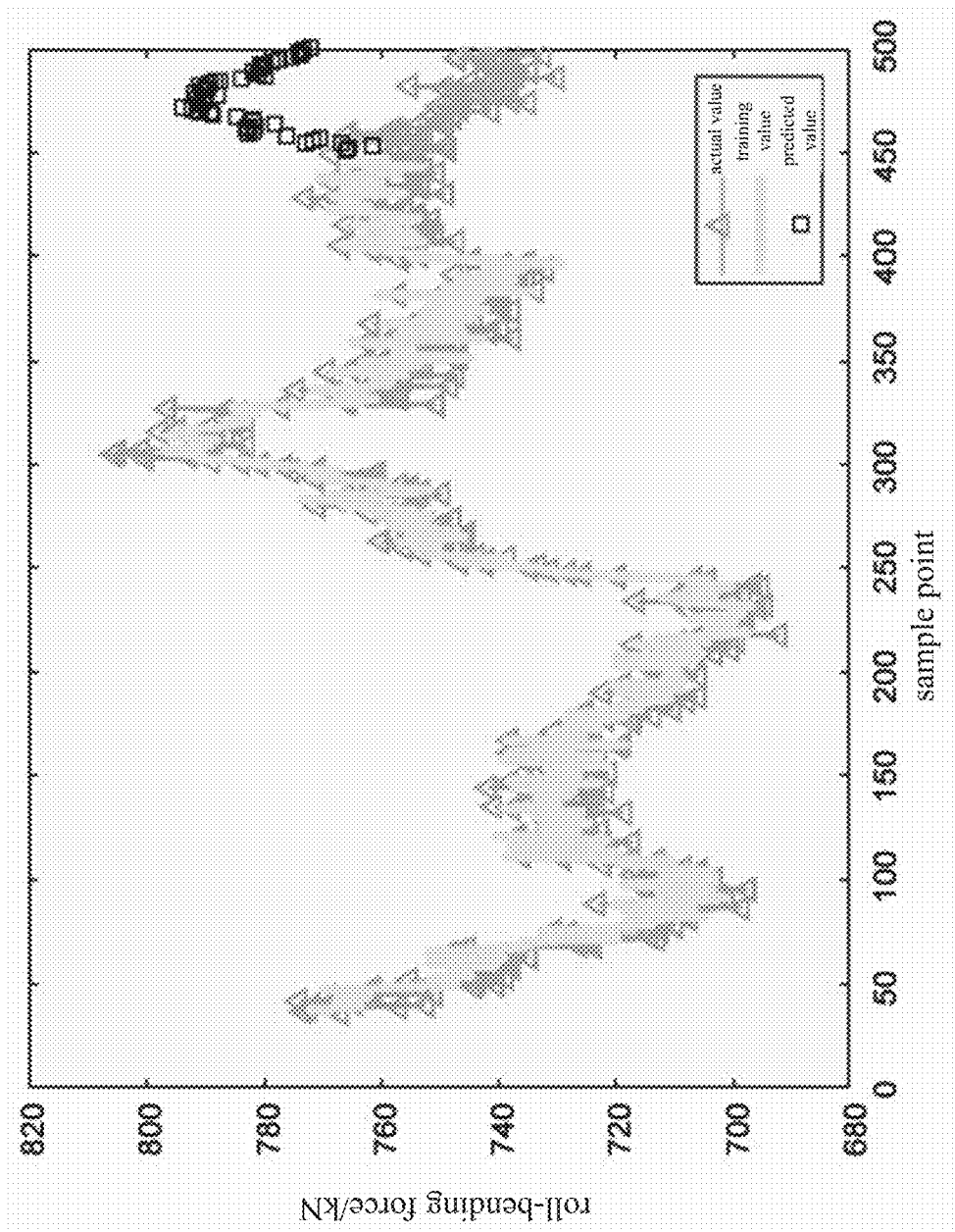
FIG. 9A shows a roll-bending force prediction result of an ANN network for a data set (1).
Figure 9B:
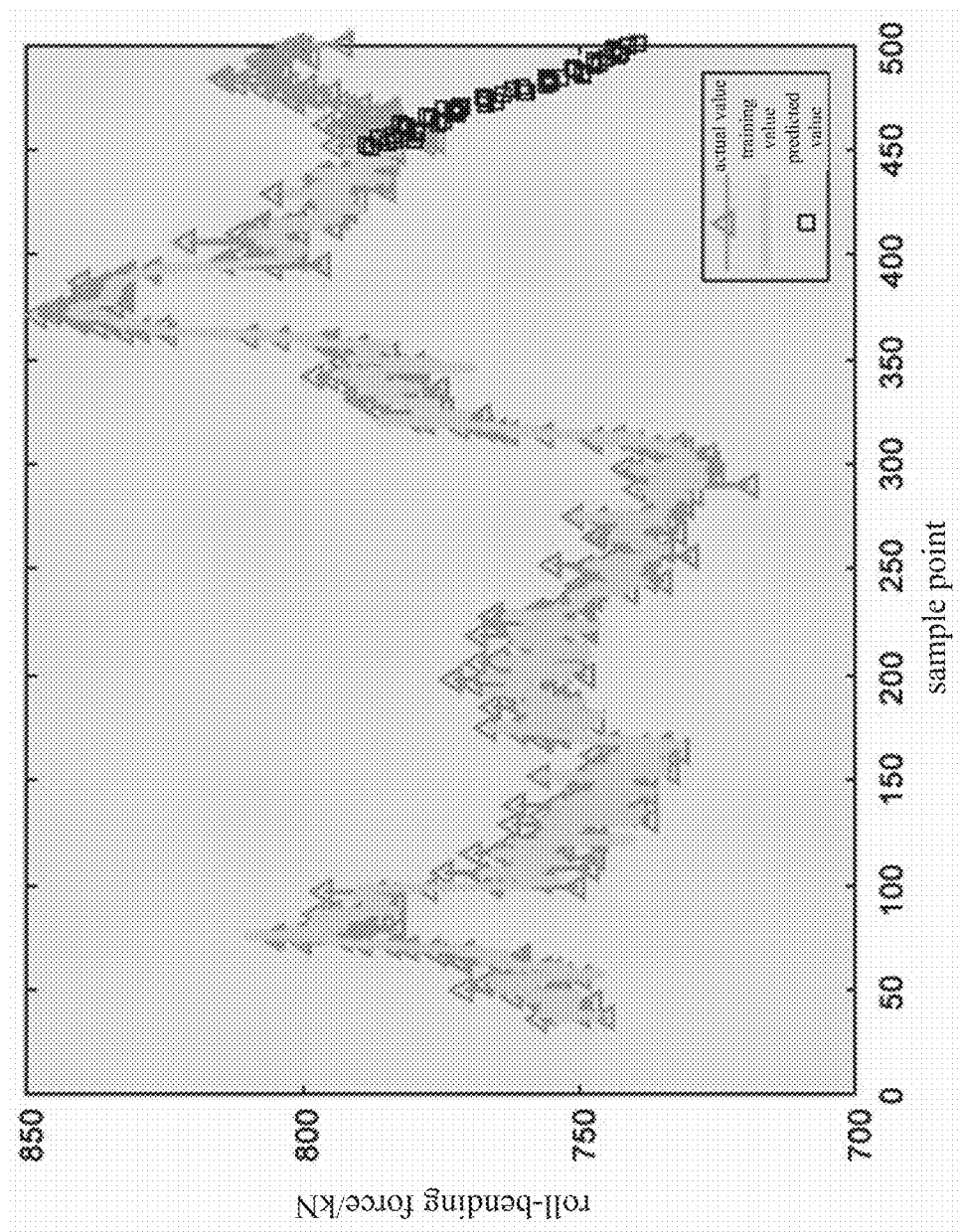
FIG. 9B shows a roll-bending force prediction result of the ANN network for a data set (2).
Figure 9C:
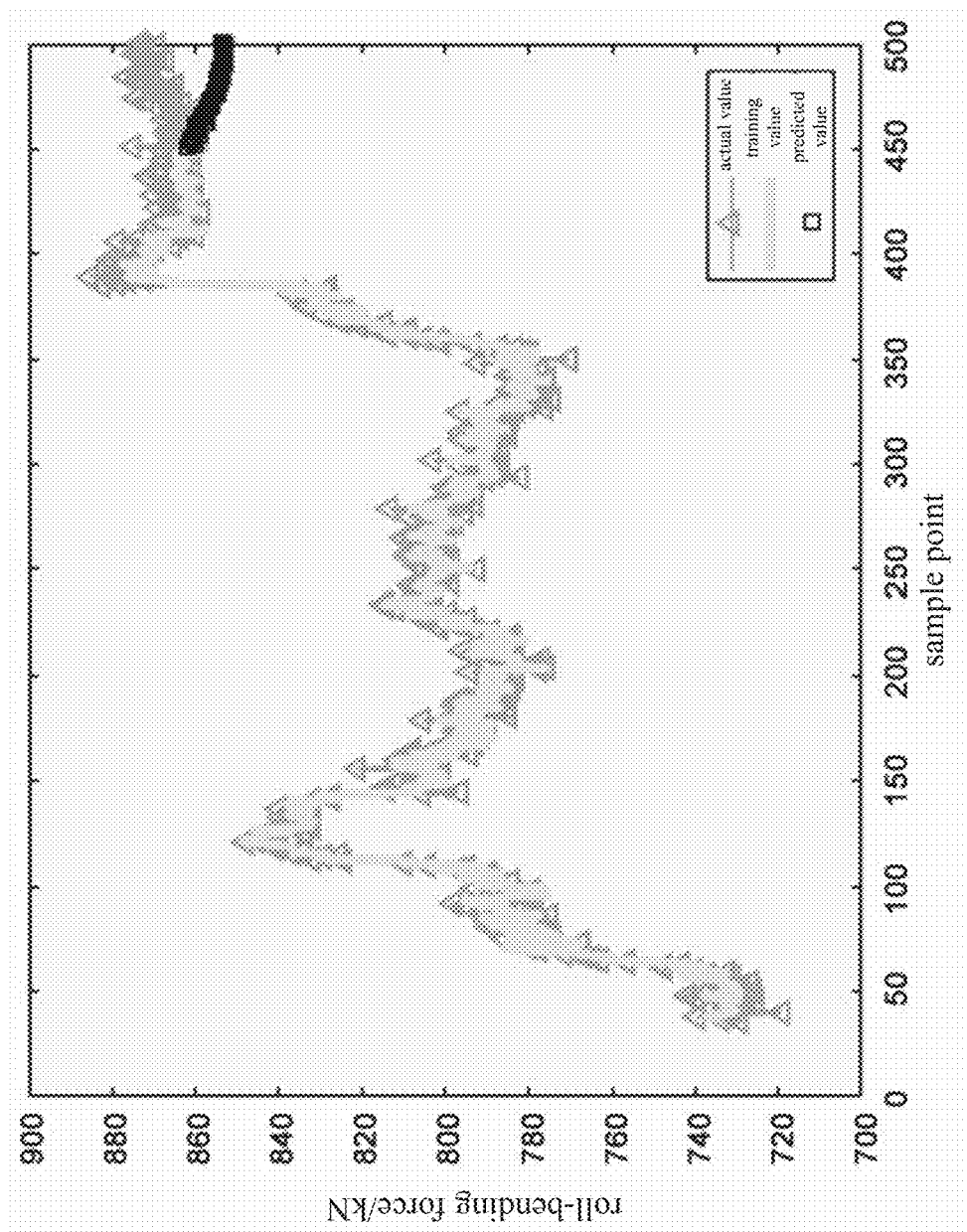
FIG. 9C shows a roll-bending force prediction result of the ANN network for a data set (3).

Under the condition of keeping the used dataset, the number of training samples, the number of prediction samples and the like unchanged, the LSTM networks used in the invention are replaced with the ANN network for comparative experiments. The results are shown as FIGS. 9A to 9C. Experiment results show that the results obtained by using the ANN network to predict the roll-bending force have a large error, and the effect is far less than the prediction effect of the three LSTM networks provided by the invention. By comparing with the ANN network, it can be seen that the LSTM networks have a strong advantage in the aspect of processing continuous time sequence, and can effectively solve the roll-bending force prediction problem, thereby having great practical significance and application value.

What is claimed is:

1. A Long Short Term Memory (LSTM)-based hot-rolling roll-bending force predicting method, comprising the following steps:

1) Acquiring final rolling data of a stand of a stainless steel rolling mill when performing a hot rolling process, and collecting roll-bending force data for experiment;

2) Dividing the roll-bending force data into two parts: a training set traindata and a test set testdata according to a specified ratio in time sequence;

3) Normalizing the traindata to obtain a normalized vector A;

4) building a matrix P by using the vector A in step 3);

5) taking first m rows of the matrix P in step 4) as an input and sending the first m rows to an LSTM network;

6) using a last row of the matrix P as a label, namely a true value, of the training set, performing calculation on an output value and the true value of the LSTM network by using a formula to obtain an error, and updating a weight and a bias of the LSTM network by a gradient descent method;

7) after the LSTM network training is completed, taking last m output data of the LSTM network as an input at a next moment, and then obtaining the output of the LSTM network at the next moment, wherein the output is a predicted value of a roll-bending force at the next moment;

8) repeating step 7) until a number of prediction data is obtained;

9) performing an inverse normalization on the obtained predicted value of the roll-bending force, and comparing the inverse normalized predicted value of the roll-bending force with the true value in the testdata to check the validity of the LSTM network; and 10) controlling the roll-bending force of the stainless steel rolling mill based on the comparing in step 9) at a next hot rolling process.

2. The LSTM-based hot-rolling roll-bending force predicting method of claim 1, wherein in step 4), a matrix $$P = \begin{bmatrix} a_1 & a_2 & \cdots & a_{n-m} \\ a_2 & a_3 & \cdots & a_{n-m+1} \\ \vdots & \vdots & \ddots & \vdots \\ a_{m+1} & a_{m+2} & \cdots & a_n \end{bmatrix},$$

wherein a parameter m is the number of input layer units of a neural network, and n is the number of samples contained in a neural network training set.

3. The LSTM-based hot-rolling roll-bending force predicting method of claim 1, wherein in step 5), the LSTM network adopts a traditional LSTM network, or adopts an ON-LSTM network or a double-layer ON-LSTM network, and the double-layer ON-LSTM network is adopted as:

taking the first m rows of the matrix P in step 4) as an input of a first-layer LSTM, and sending obtained output data as an input to a second-layer LSTM, wherein output data of the second-layer LSTM is an output of the whole LSTM network.

* * * * *